(12) United States Patent
Cahill (10) Patent No.: US 8,463,462 B2
(45) Date of Patent: Jun. 11, 2013

(54) SYSTEMS AND METHODS FOR BRAKING SYSTEM TESTING

(75) Inventor: Eric D. Cahill, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 48 days.

(21) Appl. No.: 13/225,254

(22) Filed: Sep. 2, 2011

(65) Prior Publication Data

US 2013/0060404 A1   Mar. 7, 2013

(51) Int. Cl.
*G06F 17/00* (2006.01)

(52) U.S. Cl.
USPC ........ 701/3; 701/70; 701/71; 701/78; 701/80; 303/20; 303/112; 303/149; 303/126; 303/148; 187/248; 187/280; 187/287; 187/288; 187/290; 187/292; 187/351; 187/391; 187/393; 244/111

(58) Field of Classification Search
USPC ........... 701/3, 70, 71, 78, 80; 162/138, 164.1, 162/146, 157.1, 157.2, 157.3, 157.4, 158, 162/168.1, 169, 175, 181.1, 181.6, 181.9, 162/182, 206; 442/59, 286, 408; 428/116, 428/364; 429/249; 181/169; 427/391; 523/149; 210/505; 474/263; 303/20, 112, 122.04, 126, 303/148, 149, 150, 191; 187/248, 280, 287, 187/288, 290, 292, 351, 391, 393; 244/110 A, 244/111
See application file for complete search history.

(56) References Cited

U.S. PATENT DOCUMENTS

| | | | | |
|---|---|---|---|---|
| 3,789,611 | A * | 2/1974 | Marquardt | 60/566 |
| 4,218,882 | A * | 8/1980 | Farr | 60/413 |
| 4,293,165 | A * | 10/1981 | Hirzel | 303/155 |
| 5,578,361 | A * | 11/1996 | Tsujioka et al. | 428/144 |
| 5,978,936 | A * | 11/1999 | Chandra et al. | 714/43 |
| 5,997,106 | A * | 12/1999 | Takayama | 303/122.05 |
| 7,336,455 | B2 * | 2/2008 | Dimino et al. | 361/24 |
| 7,715,970 | B2 * | 5/2010 | Snyder | 701/81 |
| 8,197,016 | B2 * | 6/2012 | Metzger, Jr. | 303/155 |
| 8,224,653 | B2 * | 7/2012 | De Mers et al. | 704/275 |
| 8,303,048 | B2 * | 11/2012 | Anderson et al. | 303/114.3 |

* cited by examiner

*Primary Examiner* — Marc McDieunel
(74) *Attorney, Agent, or Firm* — Snell & Wilmer L.L.P.

(57) ABSTRACT

Systems and methods are provided that may he useful for testing braking systems for use in, for example, an aircraft. A system is disclosed that allows for built in testing. For example, a method if provided comprising sending, from a brake controller, a test command set to at least one of an electromechanical actuator (EMAC) and a brake servo valve (BSV) in response to a landing gear retraction, receiving, at the brake controller, feedback from the at least one of the EMAC and the BSV in response to the test command set, and comparing, at the brake controller, the feedback with a predetermined signature.

12 Claims, 5 Drawing Sheets

SYSTEMS AND METHODS FOR BRAKING SYSTEM TESTING

FIELD

The present disclosure is related to systems and methods for braking system testing for use in, for example, an aircraft.

BACKGROUND

Aircraft often include retractable landing gear. Landing gear may include one or more wheels and/or other supporting or ancillary structures. An aircraft may include a braking system comprising one or more brakes coupled to one or more wheels to effect braking. After takeoff in many aircraft, the landing gear is retracted to a compartment within the body of the aircraft to improve aerodynamics during flight. During retraction, the wheel may or may not be rotating. Typically, the braking system applies braking pressure to the wheels in order to keep the wheel stationary before, during, and/or after retraction into the aircraft body. If the braking system is in a malfunctioning state, the aircraft would not be able to detect the failure. Thus, it would be advantageous to detect brake system malfunctions prior to, during, and/or after landing gear retraction.

SUMMARY

Systems and methods disclosed herein may be useful for use in testing braking systems. In this regard, a method is provided comprising sending, from a brake controller, a test command set to at least one of an electromechanical actuator (EMAC) and a brake servo valve (BSV) in response to a landing gear retraction; receiving, at the brake controller, feedback from the at least one of the EMAC and the BSV in response to the test command set; and comparing, at the brake controller, the feedback with a predetermined signature.

In further embodiments, a system is provided comprising a brake controller in electrical communication with at least one of an EMAC and a BSV, the brake controller having a test command set for sending to the at least one of the EMAC and the BSV in response to a landing gear retraction, a wheel sensor for sensing a state of a wheel, the wheel sensor for sending feedback to the brake controller, wherein the brake controller compares the feedback with a predetermined signature.

In still further embodiments, a computer readable medium is provided wherein the computer readable medium bears instructions for brake testing, the instructions, when executed by a brake controller, cause the brake controller to perform operations comprising: sending, from the brake controller, a test command set to at least one of an EMAC and a BSV in response to a landing gear retraction; receiving, at the brake controller, feedback from the at least one of the EMAC and the BSV in response to the test command set; and comparing, at the brake controller, the feedback with a predetermined signature.

BRIEF DESCRIPTION OF THE DRAWINGS

Below is a summary of the drawing figures, wherein like numerals denote like elements and wherein.

DETAILED DESCRIPTION

The detailed description of exemplary embodiments herein makes reference to the accompanying drawings, which show exemplary embodiments by way of illustration and its best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods disclosed herein may be useful for testing braking systems. Although the embodiments herein are described with reference to testing braking systems used in connection with aircraft, such embodiments are provided for example only as it is contemplated that the disclosures herein have applicability to other vehicles, such as for example, automobiles.

Aircraft may comprise one or more types of aircraft wheel and brake assemblies. For example, an aircraft wheel and brake assembly may comprise a non-rotatable wheel support, a wheel mounted to the wheel support for rotation, and a brake disk stack having front and rear axial ends and alternating rotor and stator disks mounted with respect to the wheel support and wheel for relative axial movement. Each rotor disk may be coupled to the wheel for rotation therewith and each stator disk is coupled to the wheel support against rotation. A back plate may be located at the rear end of the disk pack and a brake head may be located at the front end. The brake head may house one or more actuator rams that extend to compress the brake disk stack against the back plate. Torque is taken out by the stator disks through a static torque tube or the like.

The actuator rams may be electrically operated actuator rams or hydraulically operated actuator rams, although some brakes may use pneumatically operated actuator rams. In brake systems that employ fluid powered (hydraulic or pneumatic power) actuator rams, the actuator ram may be coupled to a power source via a brake servo valve ("BSV") and a shutoff valve ("SOV"). The SOV effectively functions as a shutoff valve, wherein in a first position (e.g., an armed position) fluid pressure is permitted to pass through the valve, while in a second position (e.g., a disarmed position) fluid pressure is prevented from passing through the valve. During normal braking, the SOV is in the armed position, thereby permitting the flow of fluid pressure. The BSV, based on braking commands from the pilot (often via an electronic controller that may implement, for example, anti-skid logic), controls the amount of fluid pressure provided to the actuator ram, and thus, the braking force applied to the wheel. To prevent unintentional braking (e.g., due to a faulty servo valve) at various times, the SOV is set in the disarmed position, thereby removing fluid pressure from the BSV. Since the BSV does not receive fluid pressure, it cannot provide fluid pressure to the actuator ram and, thus, braking cannot be effected.

In electronic brakes, a brake controller is coupled to one or more electromechanical actuator controllers ("EMAC") for brakes, which drives one or more electromechanical brake actuators. The brake controller may be in communication with a brake pedal, and thus may control the EMAC in accordance with pilot/copilot braking commands.

Braking systems in aircraft typically include sensors that detect aircraft status information. Aircraft status information may mean any information relating to the status of an aircraft, for example, the presence of weight on wheels, aircraft velocity, aircraft acceleration, wheel velocity, wheel acceleration, air temperature, the pressure applied to the brake stack during braking, global positioning system coordinates, and the like. A brake controller may have access to various aircraft status information at any given time.

A braking system may include built-in testing logic. Built-in testing logic may comprise logic to perform certain tests (i.e., diagnostics) to determine whether the braking system is in a malfunctioning state. Built-in testing logic may reside in a brake controller or any other component of a braking system or other system in communication with the braking system. Built-in testing logic may also include safety features which use aircraft status information to verify that the brake system is in condition for testing. In this manner, built-in diagnostics will not execute while a braking is being commanded (i.e., during a landing).

Figure 1:
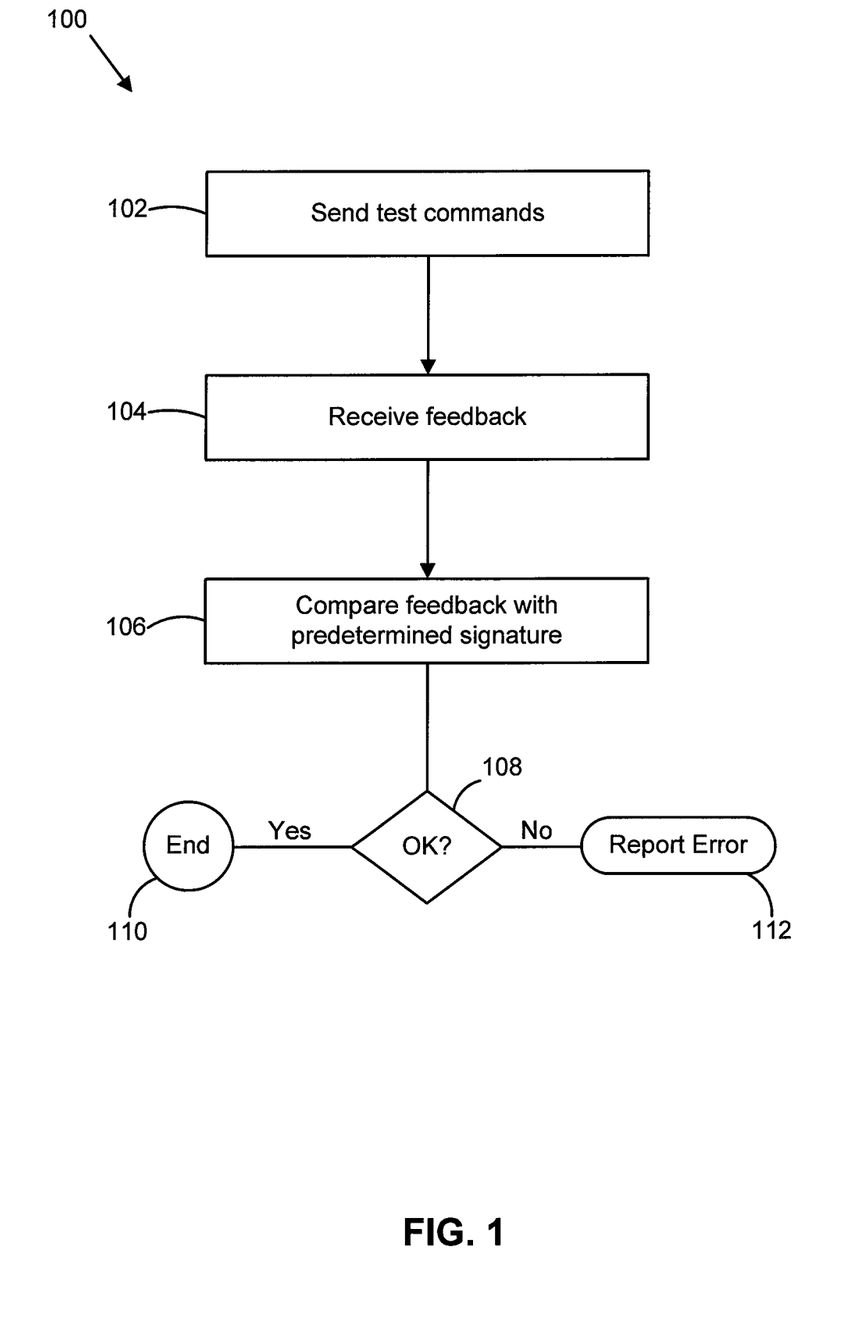
FIG. 1 illustrates a brake system testing method in accordance with various embodiments.

An exemplary brake system test 100 is illustrated in FIG. 1. Brake system test 100 comprises send test commands 102. Send test commands 102 may comprise the sending or transmission of one or more braking commands to one or more components. The one or more braking commands sent during send test commands 102 may be referred to as a test command set. A test command set may comprise of one or more commands that instruct a braking systems to apply varying amounts of pressure on the brake stack. For example, a test command set may comprise a command to apply X psi on the brake stack for A seconds (or other unit of time such as milliseconds), Y psi for B seconds, and Z psi for C seconds. The execution of a test command set may be referred to as a diagnostic.

A test command set may be sent by the brake controller to one or more other braking components. For example, an EMAC may receive test commands from a test command set or a BSV may receive test commands from a test command set, either directly or through other components. In various embodiments, an EMAC or BSV will apply braking pressure in response to the test command set and in accordance with the test command set.

During and/or after a test command set is executed, feedback data may be detected and stored or transmitted. Feedback comprises aircraft status information acquired or detected during and/or after a test command set is executed. Feedback may comprise characteristics or status of the braking system and braking system components. For example, feedback may comprise the observed brake pressure applied at a brake at a given time. Feedback may also comprise wheel velocity, wheel acceleration, and other like data.

During and/or after a test command set is executed, a brake controller or other braking system component receives feedback 104. Feedback may be sent by a BSV, EMAC, wheel speed sensor, brake pressure sensor, or any other aircraft component that detects aircraft status information. The brake controller may collect feedback before, during, and after the test command set executes.

It should be appreciated that, in any braking system, the commands sent by the brake controller may not be executed by another component (e.g. BSV or EMAC) in precisely the manner and amount commanded. For example, a brake command for 2 psi of braking pressure may result in a BSV applying 2.1 psi. This is because braking systems may function differently based upon braking system age or component age, environmental operating conditions, and other variables. In addition, the application of pressure at a brake (i.e., at the actuator) lags the brake command that commands the pressure by a (typically short) period of time. Accordingly, braking systems are typically designed to operate within set boundaries or tolerances for optimum safety and performance. In this manner, an actuator that applies 1% more pressure than commanded may be considered acceptable when one that applies 3% more may be deemed malfunctioning. In addition, the change of braking pressure may be accomplished within a certain acceptable time frame. For example, after commanding a change in pressure of from about 20 psi to about 200 psi, it may be excepted that 200 psi be reached with a certain time period of the brake command.

The set or boundaries or tolerances in which a braking system is intended to operate may be referred to as a predetermined signature pattern. In other words, the set of acceptable performance standards may be stored as a predetermined signature pattern. A predetermined signature pattern, for example, may specify that braking may lag the brake command up to a certain amount of time, and that brake pressure applied may differ from the brake command by a certain percentage.

Figure 4:
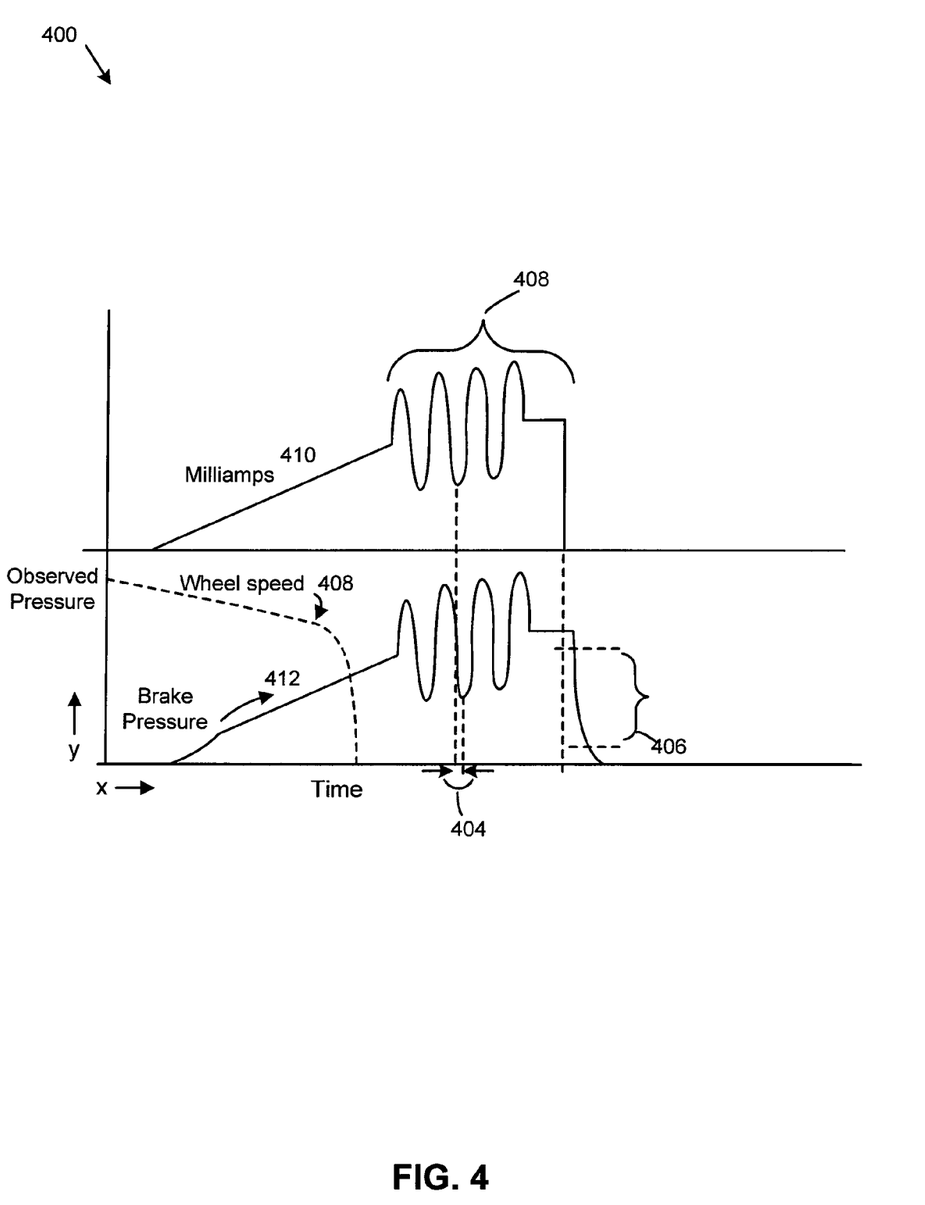
FIG. 4 illustrates a sample predetermined signature.

An exemplary predetermined signature 400 is illustrated in FIG. 4. Predetermined signature 400 shows observed pressure on the y axis and time on the x axis. Milliamps 410 is shown to represent the amount of brake pressure commanded during the diagnostic. Brake pressure 412 is shown below milliamps 410 to represent expected brake pressure as detected at the brake. Thus, brake pressure 412 represents the brake pressure that would be observed in a non-malfunctioning brake. As shown, the brake pressure may lag the commanded pressure, as shown in lag 404, which shows the time difference between the commanded pressure and the application of the commanded pressure. Pressure pulses 408 illustrate the commanded changes in brake pressure over the observed brake pressure. Delay 406 illustrates the time the applied brake pressure decreasing as the test command set nears completion.

With reference back to FIG. 1, a comparison of feedback with predetermined signature 106 may comprise comparing the predetermined signature (e.g., the predetermined signature of FIG. 4), with the feedback. The feedback may show that the braking system is with the acceptable tolerances, or it may show that the braking system is not operating with acceptable tolerances.

Figure 5:
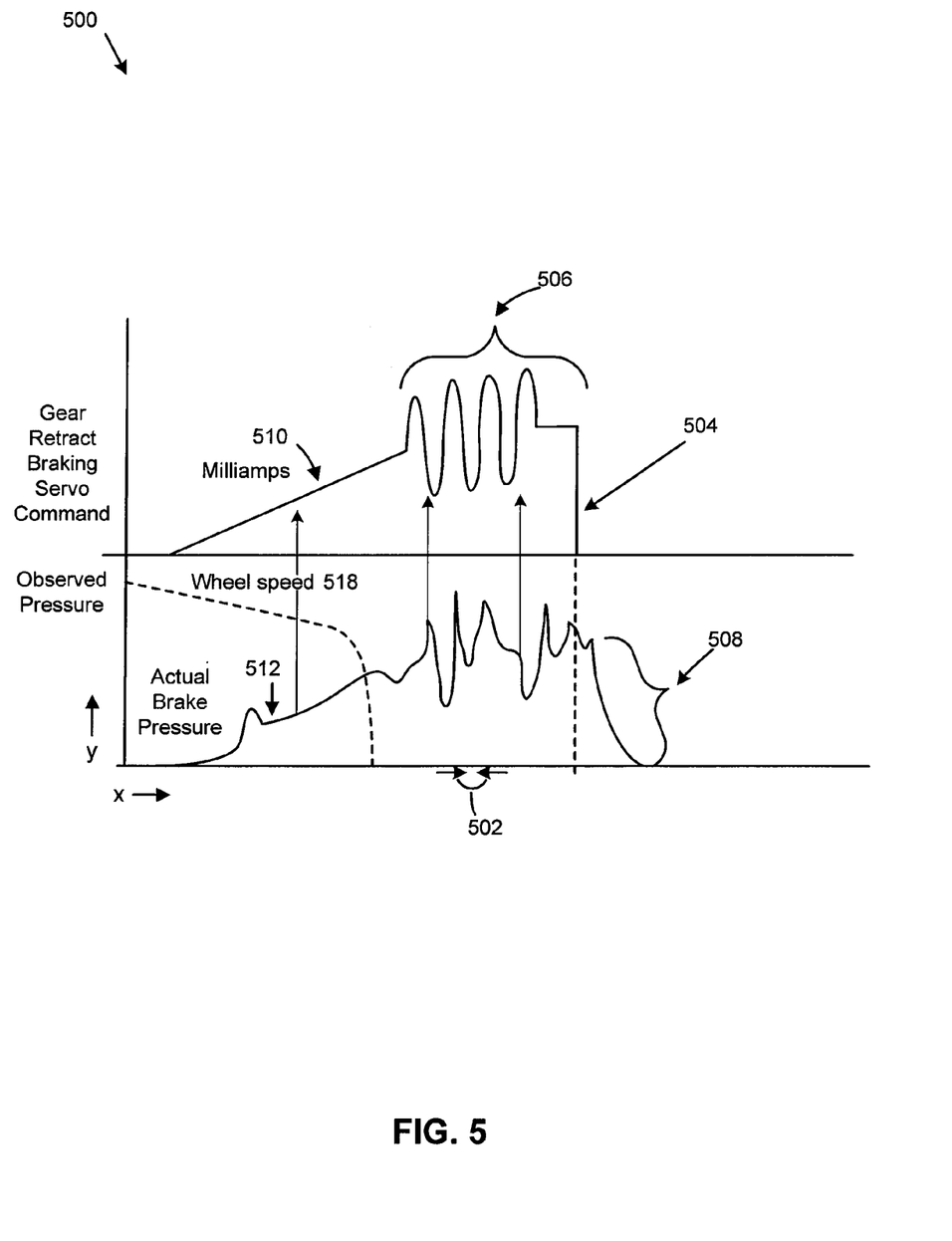
FIG. 5 illustrates feedback data indicative of a malfunctioning brake system.

For example, with reference to FIG. 5, malfunctioning brake feedback 500 is shown. Brake pressure is shown on the y axis and time on the x axis. Milliamps 510 illustrate the test commands. Actual brake pressure 512 shows the brake pressure actually detected during the diagnostic. Pressure pulses 506 are shown as commanded pressure pulses on milliamps 510 over the observed pulses on actual brake pressure 512. As shown, actual brake pressure 512 shows that the actual brake pressure does not correspond to the commanded brake pressure. Lag 502 also shows a longer lag time than lag 404 in FIG. 4. Delay 508 also shows an extended period of time between the release of commanded brake pressure and the actual release of brake pressure. Thus, the actual brake pressure 512 is indicative of the braking system being in a malfunction state. Depending upon the particular feedback, the likely cause of the malfunction may be determined. For example, a clogged valve may lead to longer than expected delays times. Moreover, the end point of a maintenance interval may be estimated in response to the observed brake feedback. A maintenance interval may be the interval between required or desired maintenance (or removal/replacement) of a particular component or system. An end point of a maintenance interval would indicate that a particular component or system requires maintenance or removal/replacement. Observed brake feedback, such as malfunctioning brake feedback 500, may indicate that the end point of a maintenance interval has arrived or is near. Historical feedback may be used to estimate the end point of a maintenance interval.

With reference back to FIG. 1, OK 108 represents a determination of the comparison between the feedback and the predetermined signature. If the feedback indicates that all or substantially all of the test commands were executed within tolerances, end point 110 is reached. At end point 110, the feedback may be stored in a data store with, for example, appropriate metadata such as time, date, global coordinates, and other aircraft status information. Feedback stored in this manner may be referred to as historical feedback. As described below, historical feedback may be analyzed over time and may be used for trend analysis. For example, historical feedback may be used to identify component wear trends. If some or all of the test commands were not executed within tolerances, report error 112 is reached. Report error 112 may comprise reporting or recording an error message and/or error code. The reporting may be forwarded to the cockpit to indicate a potentially malfunctioning brake system, though the report may also simply be stored in memory for later assessment. This may be appropriate where the feedback is near enough to tolerances to allow for safe operation of the braking system.

Figure 2:
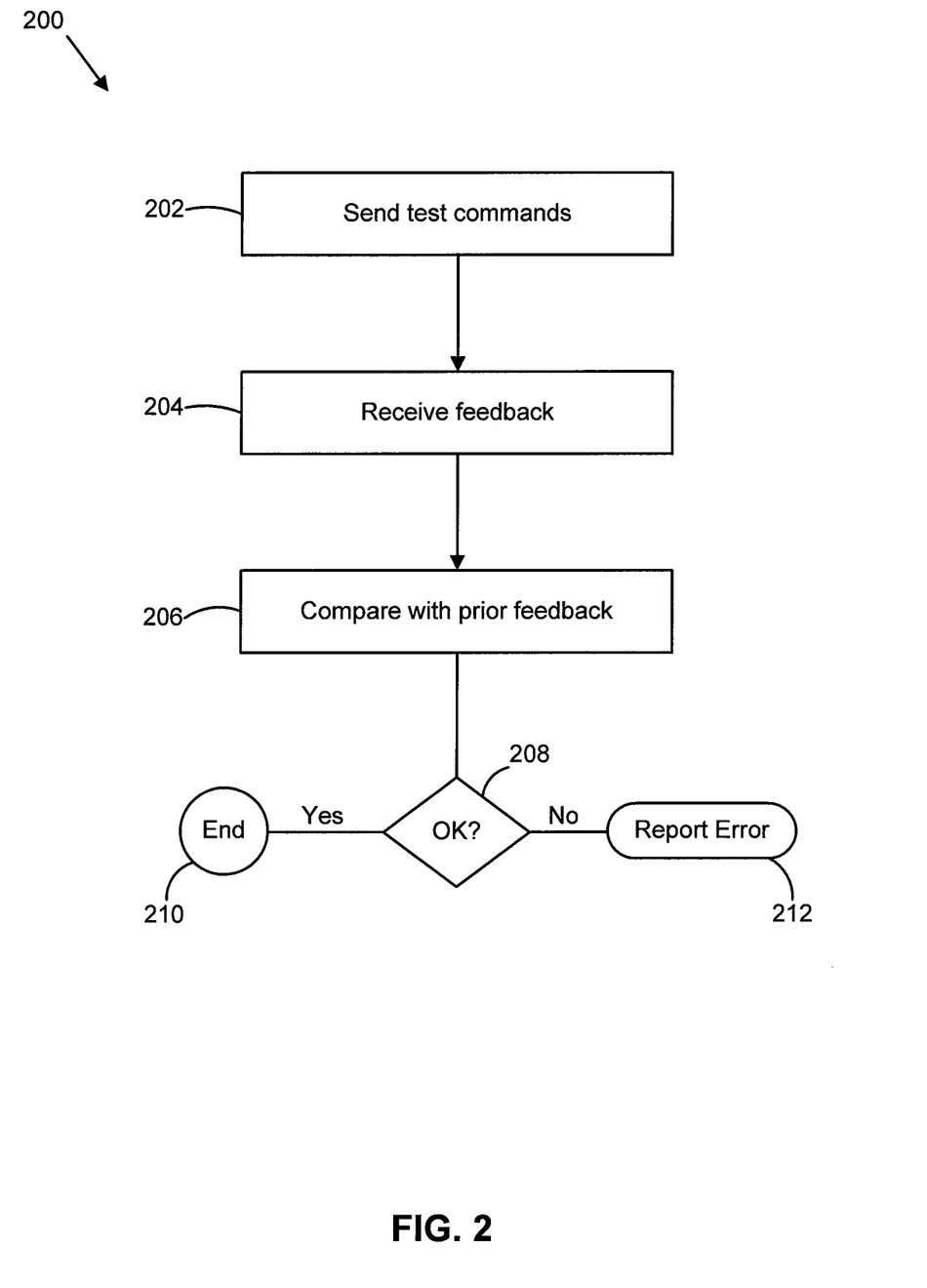
FIG. 2 illustrates a further brake system testing method in accordance with various embodiments.

With reference to FIG. 2, a further embodiment 200 is illustrated. As in FIG. 1, send test commands 202 comprises sending test commands to one or more braking system components. Receiving feedback 204 comprises receiving feedback in response to the test command set execution. Compare with prior feedback 206 may comprise comparing the feedback of receive feedback 204 with feedback generated on the same or similar braking system previously(e.g., historical feedback). In this manner, feedback may be tracked over multiple diagnostic tests. A malfunctioning state may be determined when the feedback of receive feedback 204 differs from one or more prior feedbacks by a predetermined amount. Such a scenario may indicate the need for equipment to be serviced. As in FIG. 1, the comparison at OK 208 may end at end 210 if the feedback is completely or substantially within tolerances or may end at report error 212 is the feedback differs from one or more previous feedback sets.

Figure 3:
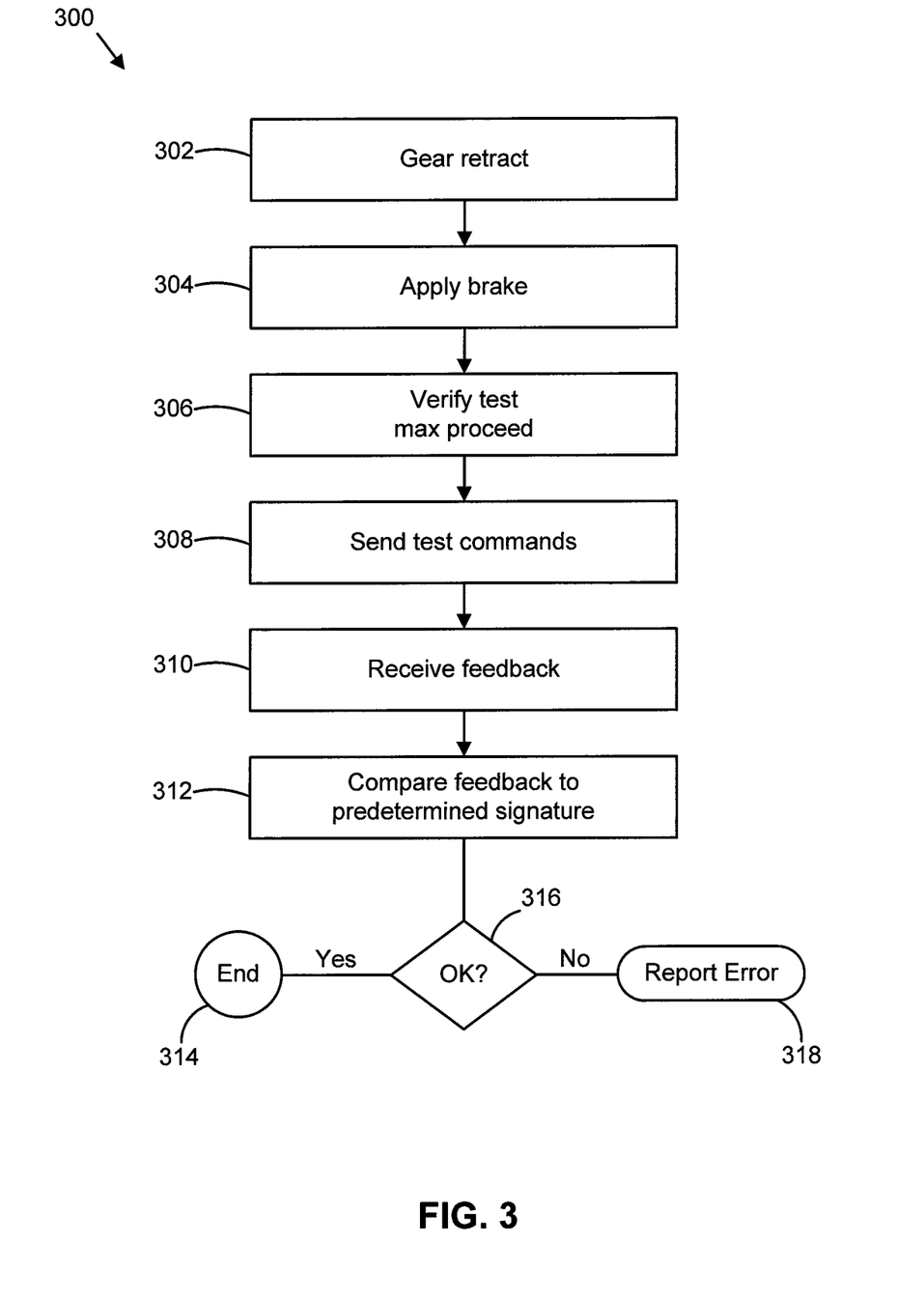
FIG. 3 illustrates an additional brake system testing method in accordance with various embodiments.

With reference to FIG. 3, embodiment 300 comprises gear retract 302 which comprises the retraction of landing gear. Gear retract 302 comprises the initial start of gear retraction, and in various embodiments may also include the retraction process (i.e., during the retraction motion) and a period of time after the landing gear has retracted.

Apply brake 304 comprises a period of time during which a brake is applied to slow or stop a wheel. Apply brake 304 may occur during gear retract 302, in various embodiments. In other words, apply brake 304 may occur or begin to occur prior to landing gear retraction, during landing gear retraction, and/or after landing gear retraction. The wheel to which braking is applied need not stop during apply brake 304. Thus, the wheel speed during a diagnostic may be about 0 mph or may be above about 0 mph.

The verify test may proceed function 306 comprises using aircraft status information to determine whether a diagnostic may be run safely. For example, a weight on wheels signal may indicate there is no weight on wheels, thus indicating that the aircraft is in flight. The aircraft velocity may be higher than the velocity the aircraft could achieve on the ground, thus indicating that the aircraft is in flight. In like manner, any aircraft status information may be used to determine that it is safe to proceed with diagnostics.

Send test commands 308, receive feedback 310, and compare feedback with predetermined signature 312 function in a similar manner as described above. In addition, compare feedback with predetermined signature 312 may comprise the functionality described above with reference to compare with prior feedback 206 of FIG. 2. In such a manner, compare feedback with predetermined signature 312 may be used to compare feedback with predetermined signature and/or compare with prior (i.e., historical) feedback. As in FIGS. 1 and 2, the comparison at OK 316 may end at end 314 if the feedback is completely or substantially within tolerances (as determined by the predetermined signature and/or the previous feedback) or may end at report error 318 is the feedback differs from the predetermined signature and/or one or more previous feedback sets.

Systems, methods and computer program products are provided. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

As used herein, the meaning of the term "non-transitory computer-readable medium" should be construed to exclude only those types of transitory computer-readable media which were found in In re Nuijten, 500 F.3d 1346 (Fed. Cir. 2007) to fall outside the scope of patentable subject matter under 35 U.S.C. §101, so long as and to the extent In re Nuijten remains binding authority in the U.S. federal courts and is not overruled by a future case or statute. Stated another way, the term "computer-readable medium" should be construed in a manner that is as broad as legally permissible.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
    sending, from a brake controller and in response to a landing gear retraction, a test command set to at least one of an electromechanical actuator (EMAC) and a brake servo valve (BSV);
    receiving, at the brake controller and in response to the test command set, feedback from the at least one of the EMAC and the BSV;
    comparing, at the brake controller, the feedback with a predetermined signature;
    determining, at the brake controller, whether a brake system malfunction is present,
    comparing, at the brake controller, the feedback with historical feedback;
    determining, at the brake controller, that the feedback is different from the historical feedback, and
    determining, at the brake controller, that the feedback is consistent with the predetermined signature.

2. The method of claim 1, further comprising estimating a particular malfunction, in response to the determination of the presence of a brake system malfunction.

3. The method of claim 1, further comprising estimating an end point of a maintenance interval.

4. The method of claim 1, further comprising applying braking to a wheel prior to the sending.

5. The method of claim 4, wherein the sending occurs in response to the wheel reaching a rotational velocity of about 0 mph.

6. The method of claim 4, wherein the sending occurs in response to the wheel having a rotational velocity of above about 0 mph.

7. A computer readable medium bearing instructions for brake testing, the instructions, when executed by a brake controller, cause the brake controller to perform operations comprising:
    sending, from the brake controller and in response to a landing gear retraction, a test command set to at least one of an EMAC and a BSV;
    receiving, at the brake controller and in response to the test command set, feedback from the at least one of the EMAC and the BSV;
    comparing, at the brake controller, the feedback with a predetermined signature;
    determining, at the break controller, whether a brake system malfunction is present
    comparing, at the brake controller, the feedback with historical feedback
    determining, at the brake controller, that the feedback is different from the historical feedback; and
    determining, at the brake controller, that the feedback is consistent with the predetermined signature.

8. The computer readable medium of claim 7, further comprising estimating an end point of a maintenance interval in response to the determination of the presence of a brake system malfunction.

9. The computer readable medium of claim 7, further comprising estimating an end point of a maintenance interval.

10. The computer readable medium of claim 7, further comprising apply braking to a wheel prior to the sending.

11. The computer readable medium of claim 10, wherein the sending occurs in response to the wheel reaching a rotational velocity of about 0 mph.

12. The computer readable medium of claim 10, wherein the sending occurs in response to the wheel having a rotational velocity of above about 0 mph.

* * * * *

UNITED STATES PATENT AND TRADEMARK OFFICE
CERTIFICATE OF CORRECTION

PATENT NO. : 8,463,462 B2  
APPLICATION NO. : 13/225254  
DATED : June 11, 2013  
INVENTOR(S) : Eric D. Cahill Page 1 of 1

It is certified that error appears in the above-identified patent and that said Letters Patent is hereby corrected as shown below:

On the Title page, item (57), in the first line, please delete "he" and insert therefor --be--.

On the Title page, item (57), in the fourth line, please delete "if" and insert therefor --is--.

Signed and Sealed this
Sixth Day of August, 2013

Teresa Stanek Rea
*Acting Director of the United States Patent and Trademark Office*